(12) United States Patent
Patwardhan et al.

(10) Patent No.: US 8,535,403 B2
(45) Date of Patent: Sep. 17, 2013

(54) FILTER ASSEMBLY WITH MOUNTING

(75) Inventors: Hrishikesh Patwardhan, Columbus, IN (US); Scott W. Schwartz, Cottage Grove, WI (US); Gregory W. Hoverson, Columbus, IN (US)

(73) Assignee: Cummins Filtration IP Inc., Minneapolis, MN (US)

( * ) Notice: Subject to any disclaimer, the term of this patent is extended or adjusted under 35 U.S.C. 154(b) by 72 days.

(21) Appl. No.: 13/229,835

(22) Filed: Sep. 12, 2011

(65) Prior Publication Data
US 2012/0067323 A1   Mar. 22, 2012

Related U.S. Application Data

(60) Provisional application No. 61/383,419, filed on Sep. 16, 2010, provisional application No. 61/494,503, filed on Jun. 8, 2011.

(51) Int. Cl.
B01D 46/00 (2006.01)
(52) U.S. Cl.
USPC .......... 55/385.3; 55/480; 55/493; 55/502; 55/503; 55/509; 55/DIG. 28; 123/198 E; 180/68.3
(58) Field of Classification Search
USPC ......... 55/385.3, 480, 502, 503, 529, DIG. 28; 123/195 C, 198 E; 180/68.3
See application file for complete search history.

(56) References Cited

U.S. PATENT DOCUMENTS

| | | | |
|---|---|---|---|
| 2,626,010 A | 1/1953 | Sebok | |
| 4,207,085 A | 6/1980 | Clifton | |
| 4,440,555 A | 4/1984 | Chichester | |
| 5,474,337 A | 12/1995 | Nepsund et al. | |
| 5,609,298 A | 3/1997 | Hyslop | |
| 6,375,700 B1 | 4/2002 | Jaroszczyk et al. | |
| 6,814,772 B1 * | 11/2004 | Wake et al. | 55/385.3 |
| 6,846,342 B2 | 1/2005 | Mertz et al. | |
| 6,890,366 B2 * | 5/2005 | Bugli et al. | 55/385.3 |
| 6,955,696 B1 | 10/2005 | Ost et al. | |
| 7,179,315 B2 * | 2/2007 | Huang | 55/337 |
| 7,465,329 B2 * | 12/2008 | Oshima | 55/385.3 |
| 7,597,735 B2 | 10/2009 | Terres | |
| 7,691,165 B1 | 4/2010 | Hammes | |
| 8,236,079 B2 * | 8/2012 | Fasan | 55/385.3 |
| 8,287,614 B2 * | 10/2012 | Gillispie et al. | 55/499 |
| 8,337,579 B2 * | 12/2012 | Alexander et al. | 55/385.3 |
| 8,404,015 B2 * | 3/2013 | Moser et al. | 55/385.3 |
| 2005/0247034 A1 * | 11/2005 | Canova et al. | 55/385.3 |
| 2006/0064952 A1 * | 3/2006 | Oshima | 55/385.3 |
| 2008/0011673 A1 | 1/2008 | Janikowski et al. | |
| 2008/0040883 A1 | 2/2008 | Beskow et al. | |
| 2009/0084344 A1 * | 4/2009 | Fasan | 123/198 E |
| 2012/0047856 A1 * | 3/2012 | Khami et al. | 55/385.3 |

OTHER PUBLICATIONS

International Preliminary Report on Patentability, PCT/US2011/051677, date of mailing Mar. 28, 2013.

* cited by examiner

*Primary Examiner* — Duane Smith
*Assistant Examiner* — Minh-Chau Pham
(74) *Attorney, Agent, or Firm* — Andrus, Sceales, Starke & Sawall, LLP

(57) ABSTRACT

A filter assembly, including an air cleaner assembly for an internal combustion engine in an underhood engine compartment, includes a mounting bracket with a flow passage therethrough. In one form, a combination air filter element and base is provided for an air cleaner assembly. In a further form, a filter assembly includes a filter element integrally and permanently mounted to the base for removal and replacement as a single unit.

24 Claims, 8 Drawing Sheets

FILTER ASSEMBLY WITH MOUNTING

CROSS-REFERENCE TO RELATED APPLICATIONS

This application claims the benefit of and priority from provisional U.S. Patent Application No. 61/383,419, filed Sep. 16, 2010, and provisional U.S. Patent Application No. 61/494,503, filed Jun. 8, 2011, both incorporated herein by reference.

BACKGROUND AND SUMMARY

The invention relates to filter assemblies, including air cleaner assemblies for an internal combustion engine in an underhood engine compartment.

Filter assemblies including air cleaner assemblies for internal combustion engines in an underhood engine compartment are known in the prior art. The filter assembly is mounted in the underhood engine compartment and supplies clean filtered combustion air to the engine.

The present disclosure arose during continuing development efforts in the above technology.

DETAILED DESCRIPTION

Figure 1:
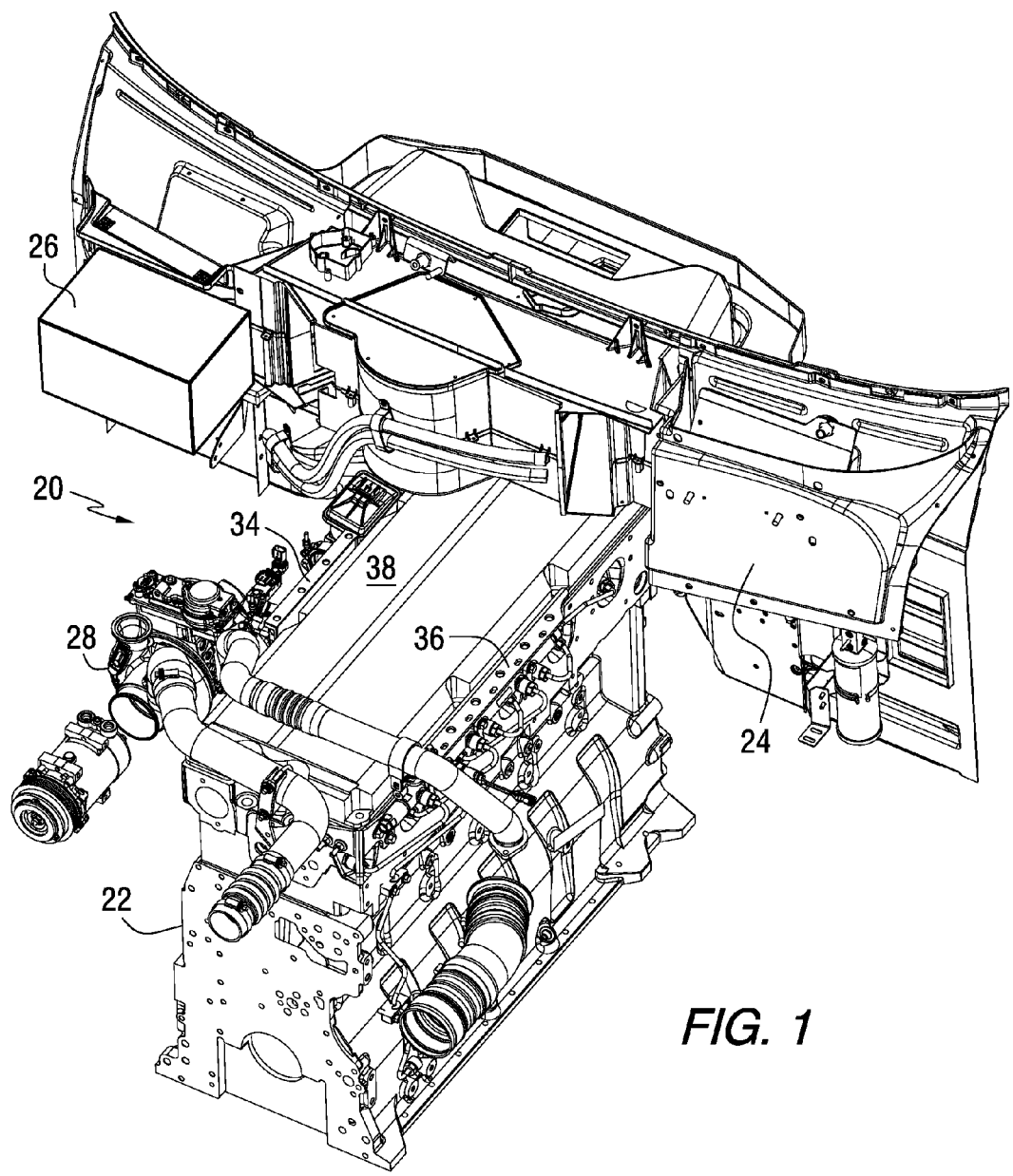
FIG. 1 is a perspective view showing a portion of an underhood engine compartment.
Figure 2:
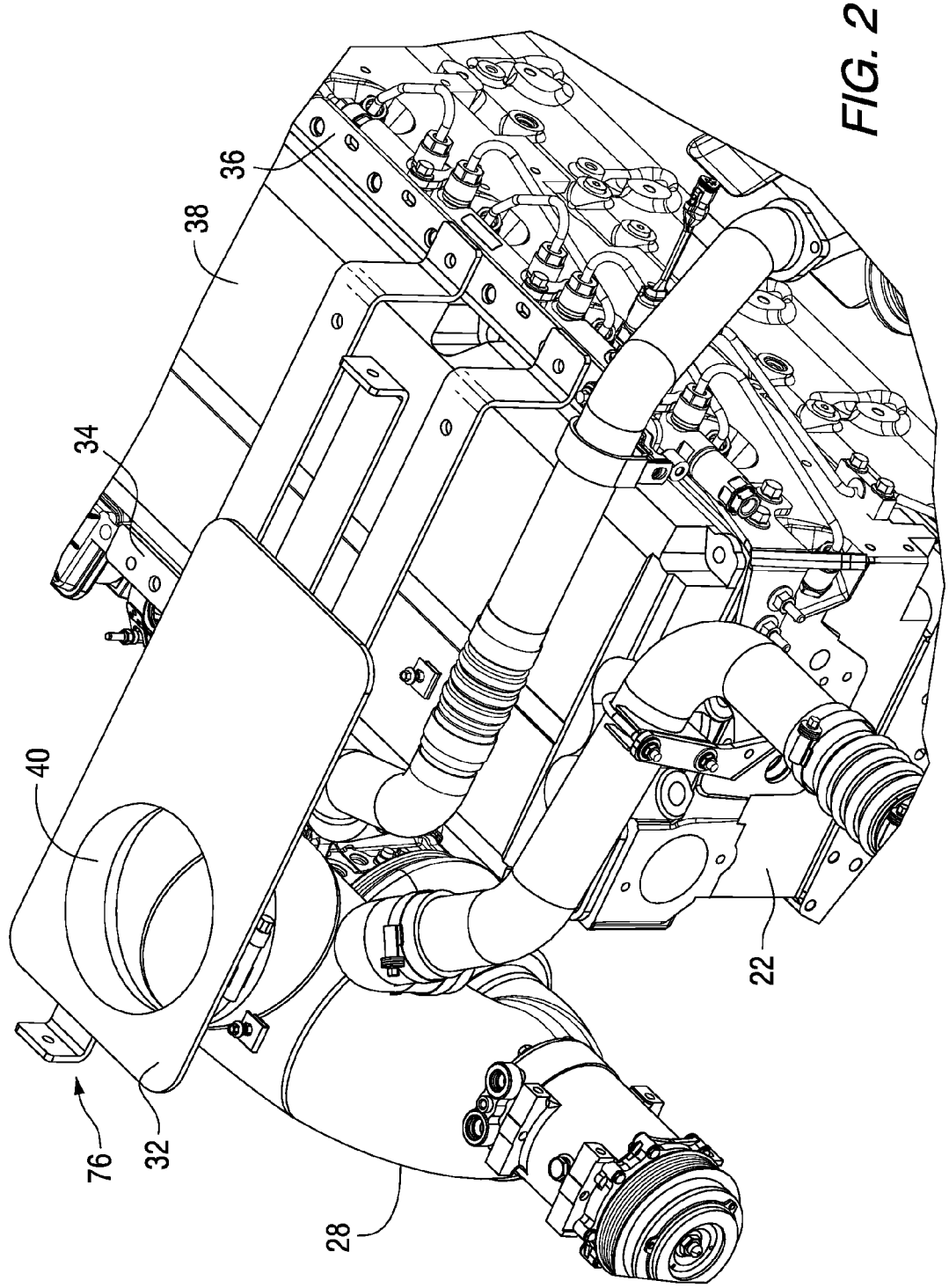
FIG. 2 is an enlarged view of a portion of FIG. 1 and additionally showing a mounting bracket.

FIG. 1 shows a portion of an engine compartment 20 including an internal combustion engine 22 and a firewall 24. Schematically shown at box 26 is a typical location for mounting an air cleaner assembly for supplying clean filtered combustion air to the engine, e.g. to the compressor portion of a turbocharger such as 28, all as is known.

Figure 3:
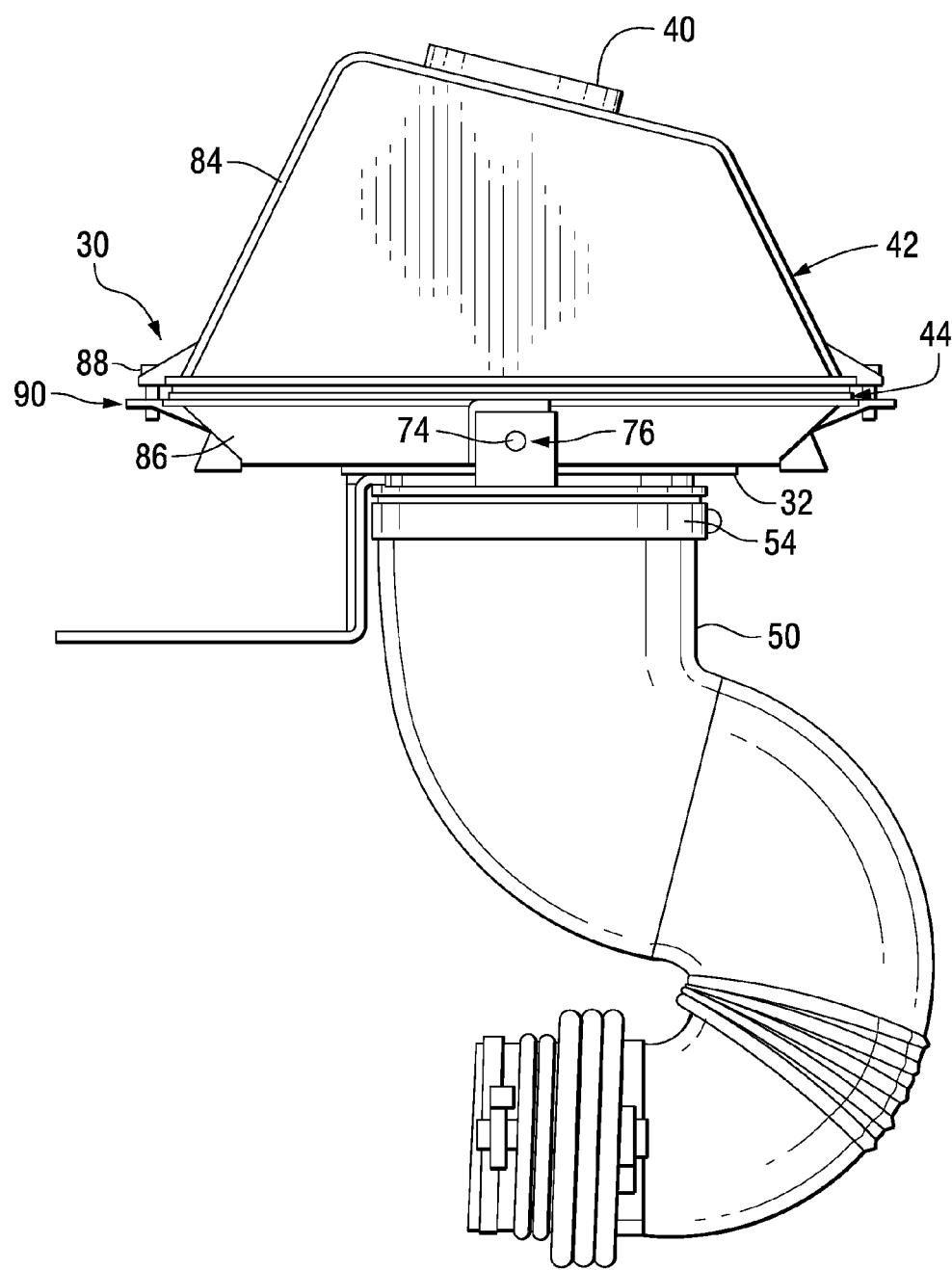
FIG. 3 is a side elevation view of an air cleaner assembly and combustion air duct.

Referring to FIGS. 2-5, an air cleaner assembly 30, FIG. 3, includes a bracket 32 mounted to a designated component in the underhood engine compartment. In one embodiment, such component is one or more of the mounting rails or platforms such as 34, 36 provided by the engine manufacturer, FIGS. 1, 2. These mounting rails or platforms may be along the engine valve cover 38. In alternate embodiments, the air cleaner assembly may be mounted to one or more other designated components in the underhood engine compartment. Bracket 32 forms a combustion air flow passage 40 therethrough. An air filter 42 includes a housing 44 mounted to bracket 32, to be further described, and having a dirty air inlet 46 and a clean air outlet 48. A combustion air duct 50, FIGS. 3, 5, has an inlet 52 receiving clean filtered combustion air through bracket 32 and supplying the clean combustion air to the engine. The clean air outlet 48 of the filter housing and the inlet 52 of combustion air duct 50 are each sealed at bracket 32, FIG. 6, such that clean filtered air exits the air filter at clean air outlet 48 of the filter housing and flows through the combustion air flow passage 40 of bracket 32 and through inlet 52 of combustion air duct 50 as clean combustion air supplied to the engine.

Figure 5:
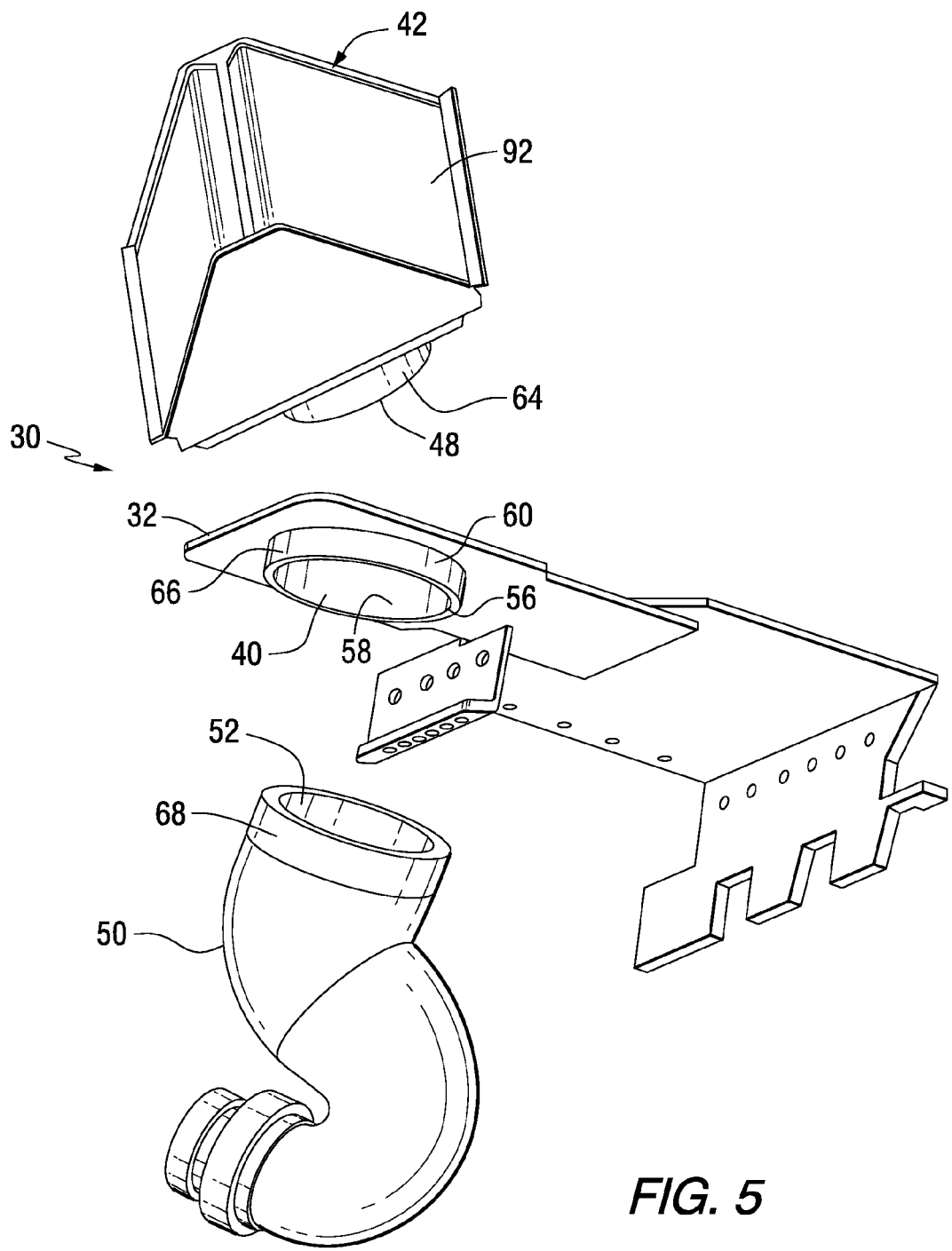
FIG. 5 is an exploded perspective view of some of the components of FIG. 3.
Figure 6:
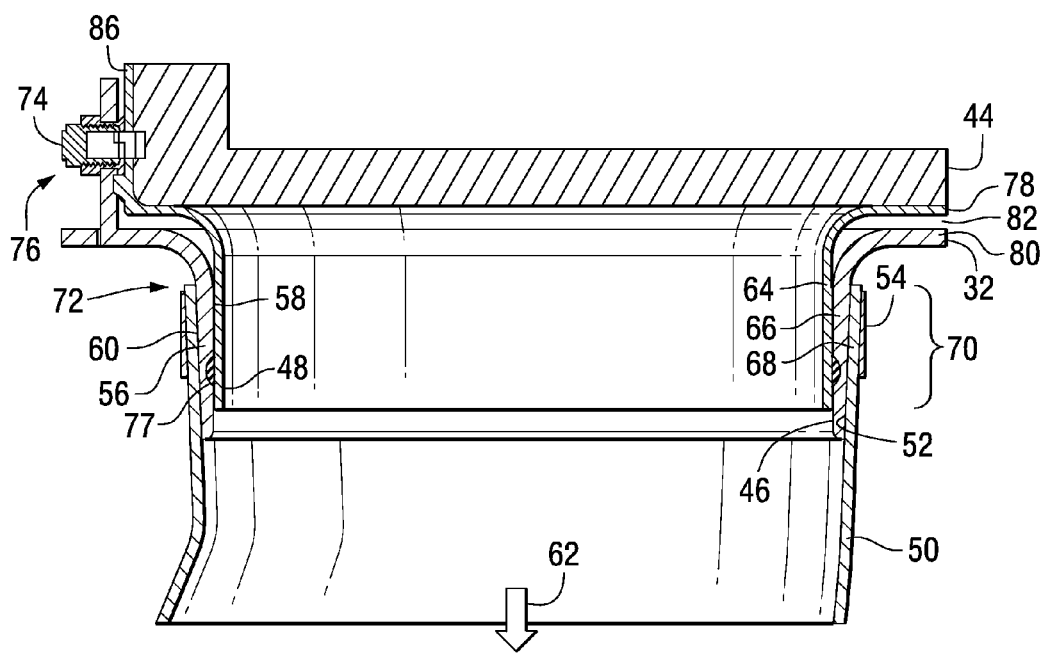
FIG. 6 is an enlarged sectional view of a portion of FIG. 3.

Referring to FIG. 6, clean air outlet 48 of the filter housing and inlet 52 of combustion air duct 50 are each sealed to bracket 32 at combustion air flow passage 40. A clamp 54, such as a band clamp, provides clamping sealing pressure to at least one interface between combustion air flow passage 40 of bracket 32, clean air outlet 48 of the filter housing, and inlet 52 of combustion air duct 50. Bracket 32 has a sidewall 56, FIGS. 5, 6, defining combustion air flow passage 40. Sidewall 56 has first and second distally oppositely facing surfaces 58 and 60. Clean air outlet 48 of the filter housing engages first surface 58 in sealing relation. Inlet 52 of combustion air duct 50 engages second surface 60 in sealing relation. Air flows axially along an axial flow direction 62 through combustion air flow passage 40 of bracket 32. One of the noted first and second surfaces of sidewall 56, e.g. first surface 58, faces radially inwardly towards combustion air flow passage 40. The other of the first and second surfaces of sidewall 56, e.g. second surface 60, faces radially outwardly away from combustion air flow passage 40.

Each of clean air outlet 48 of the filter housing, sidewall 56 of combustion air flow passage 40 of bracket 32, and inlet 52 of combustion air duct have respective axial extension sections 64, 66, 68, FIGS. 5, 6, axially overlapping each other at an overlap region 70. Axial extension section 66 of sidewall 56 of combustion air flow passage 40 of bracket 32 is sandwiched radially between axial extension section 64 of clean air outlet 48 of the filter housing and axial extension section 68 of inlet 52 of combustion air duct 50 at overlap region 70. Band clamp 54 circumscribes axial extension section 68 of inlet 52 of combustion air duct 50 and axial extension section 66 of sidewall 56 of combustion air flow passage 40 of bracket 32 and axial extension section 64 of clean air outlet 48 of the filter housing at overlap region 70.

Clamp 54 is a first clamp located at a first clamping location 72, FIG. 6. A second clamp 74 is located at a second clamping location 76 and clamping and mounting the filter housing to bracket 32. First and second clamping locations 72 and 76 are spaced and separate locations. A floating radial seal 77 is provided between axial extension section 66 of sidewall 56 of combustion air flow passage 40 of bracket 32 and axial extension section 64 of clean air outlet 48 of the filter housing. In one embodiment, floating radial seal 77 is a resilient rubber or the like O-ring in a concave recess formed in surface 58 of sidewall 56 and permitting axial movement of axial extension sections 64 and 66 relative to each other. The filter housing has a first flange 78 extending radially outwardly from axial extension section 64 of clean air outlet 48 of the filter housing. Bracket 32 has a second flange 80 extending radially outwardly from axial extension section 66 of sidewall 56 of combustion air flow passage 40 of bracket 32. First and second flanges 78 and 80 are axially spaced by an axial air gap 82 reducing heat transfer therebetween.

Figure 4:
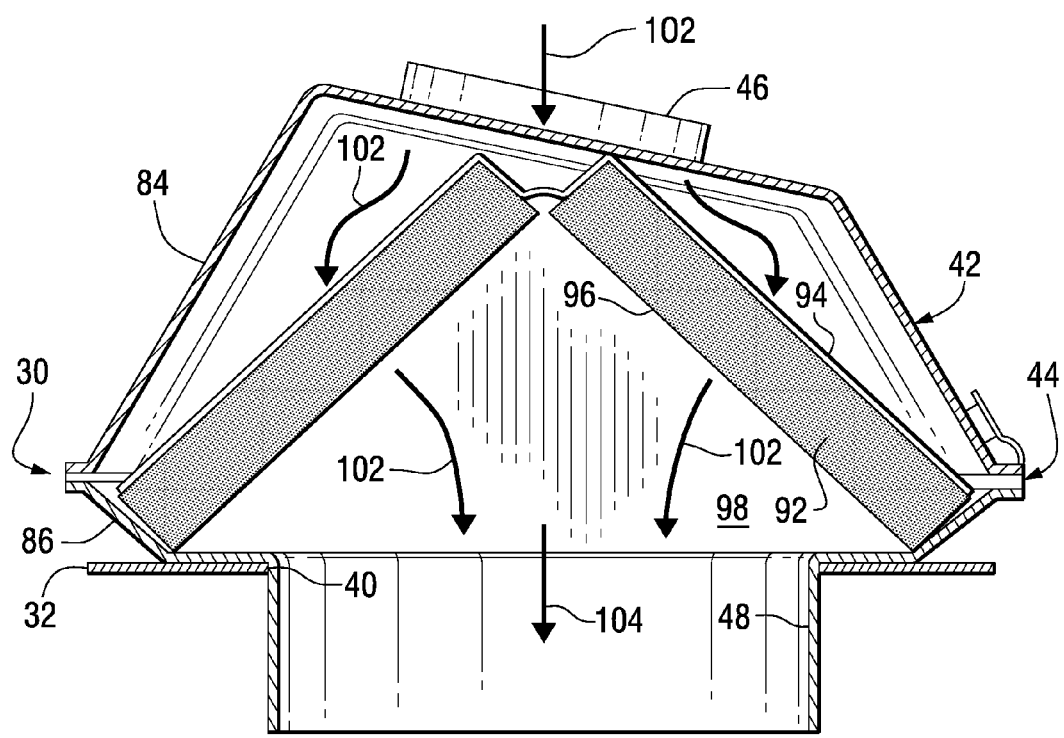
FIG. 4 is an enlarged view of a portion of FIG. 3 partially in section.
Figure 7:
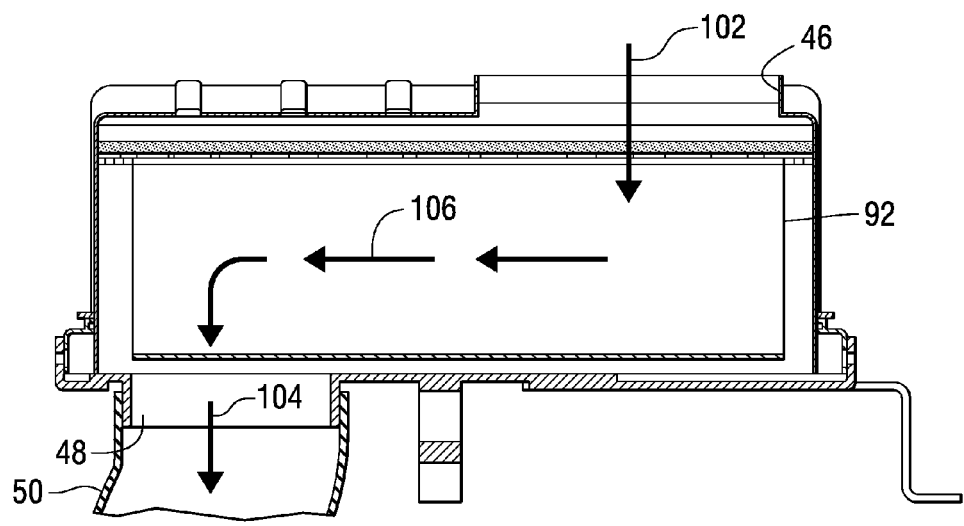
FIG. 7 is a sectional view similar to FIG. 6 and showing a further embodiment.

In some embodiments, filter housing 44 includes a cover 84, FIG. 3, detachably mounted to a base 86 at a third clamp 88 at a third clamping location 90. Base 86 is mounted to bracket 32 by second clamp 74. Third clamping location 90 is spaced and separate from first and second clamping locations 72 and 76. In some embodiments, dirty air inlet 46 is in cover 84, FIG. 4, and clean air outlet 48 is in base 86. An air filter element 92, in one embodiment having an inverted V-shape, though other air filter elements may be used, has an upstream dirty side 94 receiving dirty air from dirty air inlet 46, and a downstream clean side 96 delivering clean filtered air to clean air outlet 48. Air filter element 92 is integrally and permanently mounted to base 86 in one embodiment and defines a clean filtered air plenum 98 therebetween. In this embodiment, base 86 and air filter element 92 are removed and replaced as a single unit from and to the filter housing. Air flows through the air filter element along a first flow path into clean filtered air plenum 98 and then flows along a second flow path to clean air outlet 40. In FIG. 4, the first flow path is shown at arrows 102, and the second flown path is shown at arrow 104. First and second flow paths 102 and 104 are in the same direction. While in the clean air plenum 98, the flow may also extend along a transverse direction into and out of the page in FIG. 4, which transitional flow path is shown at 106 in FIG. 7.

Figure 8:
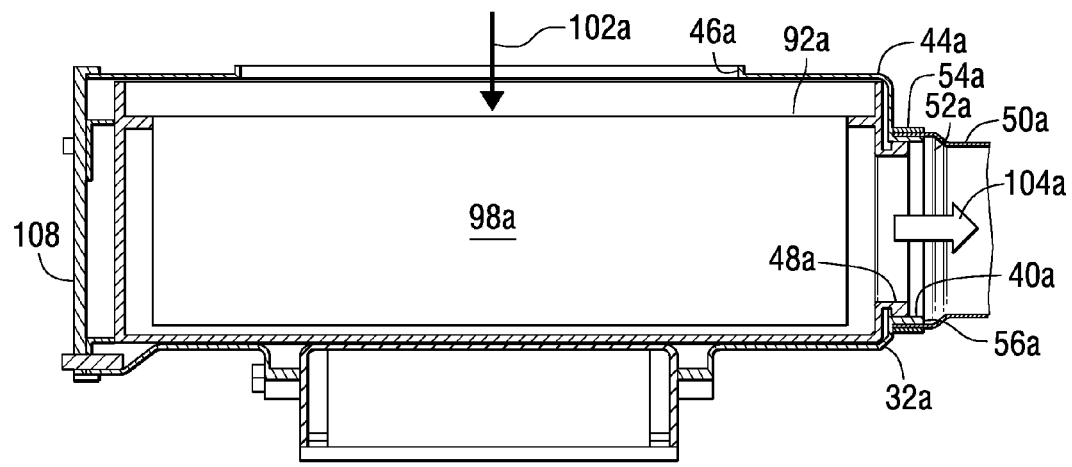
FIG. 8 is a sectional view similar to FIG. 7 and showing a further embodiment.
Figure 9:
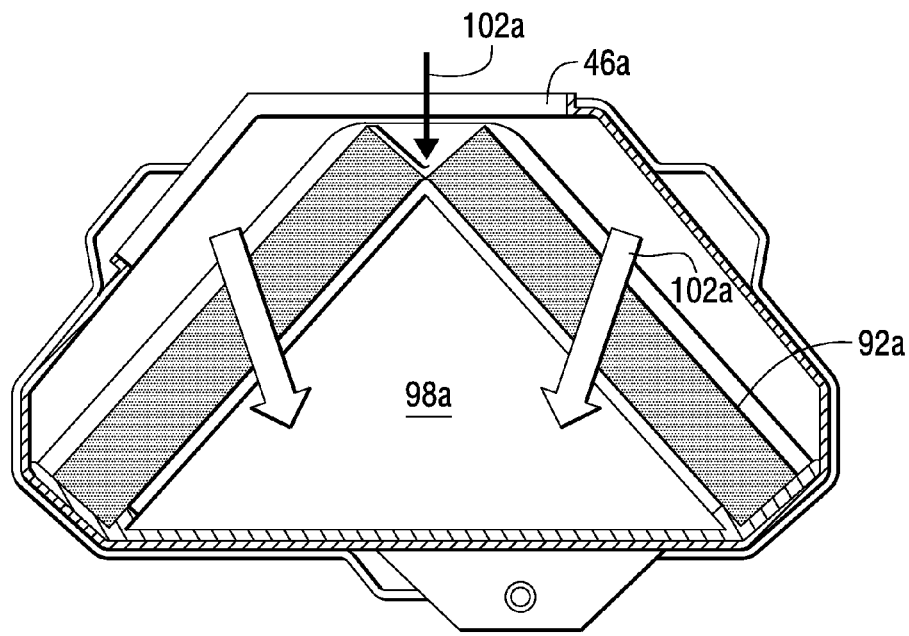
FIG. 9 is a sectional view taken transversely through FIG. 8.
Figure 10:
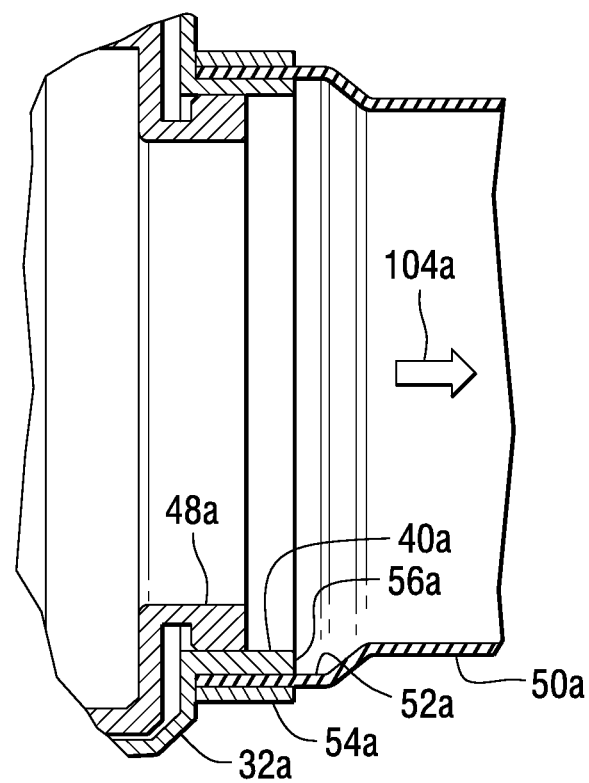
FIG. 10 is an enlarged view of a portion of FIG. 8.

In another embodiment, FIGS. 8-10, the first flow path is shown at 102a flowing into dirty air inlet 46a to be filtered by filter element 92a in filter housing 44a, whereafter the clean filtered air flows along a second flow path 104a to clean air outlet 48a. In this embodiment, air flows through air filter element 92a along first flow path 102a into clean filtered air plenum 98a after passing through filter element 92a and then flows along second flow path 104a to clean air outlet 48a. In this embodiment, first and second flow paths 102a and 104a are normal to each other. In the embodiment of FIGS. 8-10, the filter housing may have a door such as 108 which may be removed to enable servicing of filter element 92a, e.g. by pulling filter element 92a horizontally leftwardly in FIG. 8 through open or removed door 108, and then insertion of a replacement filter element horizontally rightwardly into the housing. Bracket 32a may include a combustion air flow passage 40a with sidewall 56a sandwiched between clean air outlet 48a of the filter housing and inlet 52a of combustion air duct 50a, clamped by band clamp 54a, comparably to that above described for FIG. 6.

The system provides a combination air filter element 92 and base 86 for an air cleaner assembly 30 for an internal combustion engine 22 in an underhood engine compartment 20. The air cleaner assembly has a bracket 32 mounted to a designated component, e.g. 34 and/or 36, in the underhood engine compartment. Bracket 32 forms a combustion air flow passage 40 therethrough. The combination air filter element and base 92, 86, is part of an air filter 42 including a housing 44 having a cover 84 detachably mounted to a base 86. The housing is mounted to bracket 32 and has a dirty air inlet 46 and a clean air outlet 48. The combination air filter element and base includes an air filter element 92 having an upstream dirty side 94 receiving dirty air from dirty air inlet 46, and a downstream clean side 96 delivering clean filtered air to clean air outlet 48. In one embodiment, air filter element 92 is integrally and permanently mounted to base 86 and defines a clean filtered air plenum 98 therebetween. The combination air filter element and base 92, 86 is removed and replaced as a single unit from and to the filter housing. A combustion air duct 50 having an inlet 52 receives clean filtered combustion air through bracket 32 and supplies the clean combustion air to the engine. Clean air outlet 48 of the filter housing and inlet 52 of combustion air duct 50 are each sealed at bracket 32, such that clean filtered air exits the combination air filter element and base 92, 86 at clean air outlet 48 of the filter housing and flows through combustion air flow passage 40 of bracket 32 and through inlet 52 of combustion air duct 50 as clean filtered combustion air supplied to the engine.

In further embodiments, the system provides a filter assembly 42 including a housing 44 having a cover 84 detachably mounted to a base 86. The filter housing has a dirty fluid inlet 46 and a clean fluid outlet 48. A filter element 92 has an upstream dirty side 94 receiving dirty fluid from inlet 46, and a downstream clean side 96 delivering clean filtered fluid to outlet 48. Filter element 92 is integrally and permanently mounted to base 86 and defines a clean filtered fluid plenum 98 therebetween. Base 86 and filter element 92 are removed and replaced as a single unit from and to housing 44.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation.

What is claimed is:

1. An air cleaner assembly for an internal combustion engine in an underhood engine compartment, said air cleaner assembly comprising a bracket forming a combustion air flow passage therethrough wherein said bracket is mounted to a mounting rail or platform of the underhood engine compartment, an air filter comprising a housing mounted to said bracket and having a dirty air inlet and a clean air outlet, a combustion air duct having an inlet receiving clean combustion air through said bracket and supplying said clean combustion air to said engine, said clean air outlet of said housing and said inlet of said combustion air duct each being sealed at said bracket, such that: clean filtered air exits said air filter at said clean air outlet of said housing and flows through said combustion air flow passage of said bracket and through said inlet of said combustion air duct as said clean combustion air supplied to said engine.

2. The air cleaner assembly according to claim 1 wherein said clean air outlet of said housing and said inlet of said combustion air duct are each sealed to said bracket at said combustion air flow passage.

3. The air cleaner assembly according to claim 2 comprising a clamp providing clamping sealing pressure to at least one interface between said combustion air flow passage of said bracket, said clean air outlet of said housing, and said inlet of said combustion air duct.

4. The air cleaner assembly according to claim 1 wherein said bracket has a sidewall defining said combustion air flow passage, said sidewall has first and second distally oppositely facing surfaces, said clean air outlet of said housing engages said first surface in sealing relation, said inlet of said combustion air duct engages said second surface in sealing relation.

5. The air cleaner assembly according to claim 4 wherein air flows axially along an axial flow direction through said combustion air flow passage of said bracket, one of said first and second surfaces of said sidewall faces radially inwardly towards said combustion air flow passage, the other of said first and second surfaces of said sidewall faces radially outwardly away from said combustion air flow passage.

6. The air cleaner assembly according to claim 5 wherein each of said clean air outlet of said housing, said sidewall of said combustion air flow passage of said bracket, and said inlet of said combustion air duct have respective axial extension sections axially overlapping each other at an overlap region.

7. The air cleaner assembly according to claim 6 wherein said axial extension section of said sidewall of said combustion air flow passage of said bracket is sandwiched radially between said axial extension section of said clean air outlet of said housing and said axial extension section of said inlet of said combustion air duct at said overlap region.

8. The air cleaner assembly according to claim 7 comprising a clamp band circumscribing said axial extension section of said inlet of said combustion air duct and said axial extension section of said sidewall of said combustion air flow passage of said bracket and said axial extension section of said clean air outlet of said housing at said overlap region.

9. The air cleaner assembly according to claim 7 wherein said first surface of said sidewall of said combustion air flow passage of said bracket faces radially inwardly towards said combustion air flow passage, and said second surface of said sidewall of said combustion air flow passage of said bracket faces radially outwardly away from said combustion air flow passage.

10. The air cleaner assembly according to claim 3 wherein said clamp comprises a first clamp located at a first clamping location, and comprising a second clamp located at a second clamping location and clamping and mounting said housing to said bracket, wherein said first and second clamping locations are spaced and separate locations.

11. The air cleaner assembly according to claim 10 wherein said bracket has a sidewall defining said combustion air flow passage, said sidewall has first and second distally oppositely facing surfaces, said clean air outlet of said housing engages said first surface in sealing relation, said inlet of said combustion air duct engages said second surface in sealing relation, wherein air flows axially along an axial flow direction through said combustion air flow passage of said bracket, one of said first and second surfaces of said sidewall faces radially inwardly towards said combustion air flow passage, the other of said first and second surfaces of said sidewall faces radially outwardly away from said combustion air flow passage, wherein each of said clean air outlet of said housing, said sidewall of said combustion air flow passage of said bracket, and said inlet of said combustion air duct have respective axial extension sections axially overlapping each other at an overlap region, wherein said axial extension section of said sidewall of said combustion air flow passage of said bracket is sandwiched radially between said axial extension section of said clean air outlet of said housing and said axial extension section of said inlet of said combustion air duct at said overlap region, wherein said first surface of said sidewall of said combustion air flow passage of said bracket faces radially inwardly towards said combustion air flow passage, and said second surface of said sidewall of said combustion air flow passage of said bracket faces radially outwardly away from said combustion air flow passage, and comprising a floating radial seal between said axial extension section of said sidewall of said combustion air flow passage of said bracket and said axial extension section of said clean air outlet of said housing.

12. The air cleaner assembly according to claim 11 wherein said housing has a first flange extending radially outwardly from said axial extension section of said clean air outlet of said housing, said bracket has a second flange extending radially outwardly from said axial extension section of said sidewall of said combustion air flow passage of said bracket, wherein said first and second flanges are axially spaced by an axial gap reducing heat transfer therebetween.

13. The air cleaner assembly according to claim 10 wherein said housing comprises a cover detachably mounted to a base at a third clamp located at a third clamping location, wherein said base is mounted to said bracket by said second clamp, and said third clamping location is spaced and separate from said first and second clamping locations.

14. The air cleaner assembly according to claim 13 wherein said dirty air inlet is in said cover, said clean air outlet is in said base, and comprising an air filter element having an upstream dirty side receiving dirty air from said dirty air inlet, and a downstream clean side delivering clean filtered air to said clean air outlet, said air filter element being integrally and permanently mounted to said base and defining a clean filtered air plenum therebetween, said base and said air filter element being removed and replaced as a single unit from and to said housing.

15. The air cleaner assembly according to claim 14 wherein air flows through said air filter element along a first flow path into said clean filtered air plenum and then flows along a second flow path to said clean air outlet, wherein said first and second flow paths are in the same direction.

16. The air cleaner assembly according to claim 14 wherein air flows through said air filter element along a first flow path into said clean filtered air plenum and then flows along a second flow path to said clean air outlet, wherein said first and second flow paths are normal to each other.

17. A combination an filter element and base for an air cleaner assembly for an internal combustion engine in an underhood engine compartment, said air cleaner assembly having a bracket mounted to a designated component in said underhood engine compartment wherein said component comprises a mounting rail or platform of the underhood engine compartment, said bracket forming a combustion air flow passage therethrough, said combination air filter element and base being part of an air filter comprising a housing having a cover detachably mounted to a base, said housing being mounted to said bracket and having a. dirty air inlet and a clean air outlet, said combination air filter element and base including an air filter element having an upstream dirty side receiving dirty air from said dirty air inlet, and a downstream clean side delivering, clean filtered air to said clean air outlet, said air filter element being integrally and permanently mounted to said base and defining a clean filtered air plenum therebetween, said combination air filter element and base being removed and replaced as a single unit from and to said housing, a combustion air duct having an inlet receiving clean combustion air through said bracket and supplying said clean combustion air to said engine, said clean air outlet of said housing and said inlet of said combustion air duct each being sealed at said bracket, such that clean filtered air exits said combination air filter element and base at said clean air outlet of said housing and flows through said combustion air flow passage of said bracket and through said inlet of said combustion air duct as said clean combustion air supplied to said engine.

18. The combination air filter element and base according, to claim 17 wherein said bracket has to sidewall defining said combustion air flow passage, said sidewall has first and second distally oppositely facing surfaces, said clean air outlet of said housing engages said first surface in sealing relation, said inlet of said combustion air duct engages said second surface in sealing relation, wherein air flows axially along an axial flow direction through said combustion air flow passage of said bracket, one of said first and second surfaces of said sidewall faces radially inwardly towards said combustion air flow passage, the other of said first and second surfaces of said sidewall faces radially outwardly away from said combustion air flow passage, wherein each of said clean air outlet of said housing, said sidewall of said combustion air flow passage of said bracket, and said inlet of said combustion air duct have respective axial extension sections axially overlapping each other at an overlap region, wherein said axial extension section of said sidewall of said combustion air flow passage of said bracket is sandwiched radially between said axial extension section of said clean air outlet of said housing and said axial extension section of said inlet of said combustion air duct at said overlap region.

19. The combination air filter element and base according to claim 17 wherein said air cleaner assembly has first, second and third clamps at respective first, second, and third separate clamping locations spaced along said combination air filter element and base, said combination air filter element and base having an outlet providing said clean air outlet, said first clamp providing sealing pressure to at least one interface between said combustion air flow passage of said bracket, said outlet of said combination air filter element and base, and said inlet of said combustion air duct, said second clamp clamping said combination air filter element and base to said bracket, said housing comprising a cover detachably mounted to said combination air filter element and base by said third clamp.

20. The combination air filter element and base according to claim 17 wherein said combination air filter element and base has an outlet providing said clean air outlet of said housing, said outlet of said combination air filter element and base and said inlet of said combustion air duct are each sealed to said bracket at said combustion air flow passage.

21. A filter assembly comprising a housing comprising a cover detachably mounted to a base, said housing having, a. dirty fluid inlet and a clean fluid outlet, a filter element having an upstream dirty side receiving, dirty fluid from said inlet, and a downstream clean side delivering clean filtered fluid to said outlet, said filter element being integrally and permanently mounted to said base and defining a clean filtered fluid plenum therebetween, said base and said filter element being removed and replaced as a single unit from and to said housing.

22. The filter assembly according to claim 21 wherein said inlet is in said cover, and said outlet is in said base.

23. The filter assembly according to claim 22 wherein fluid flows through said filter element along a first, flow path into said clean filtered fluid plenum and then flows along, a second flow path to said outlet, wherein said first and second flow paths are in the same direction.

24. The filter assembly according to claim 23 wherein fluid flows through said filter element along a first flow path into said clean filtered fluid plenum and then flows along a second flow path to said outlet, wherein said first and second flow paths are normal to each other.

* * * * *